Feb. 14, 1961   J. DOLEMAN ET AL   2,971,242
FLUIDISED BEDS
Filed Feb. 11, 1957   4 Sheets-Sheet 1
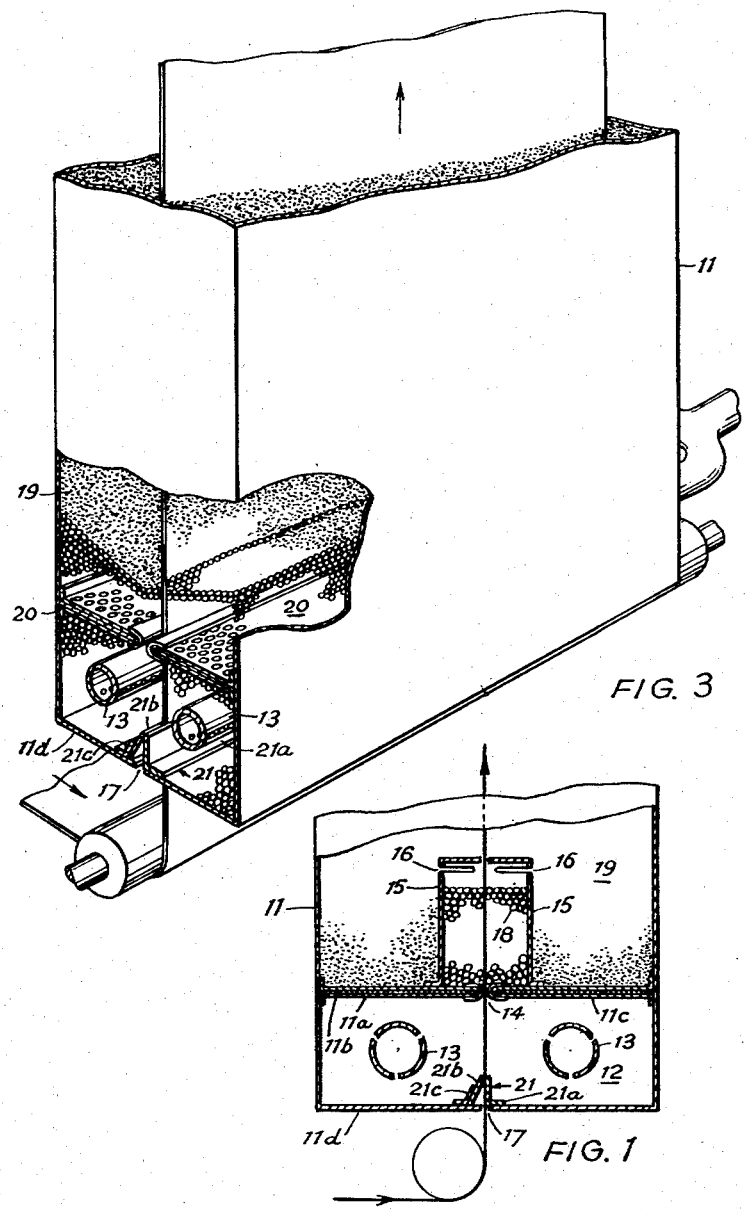

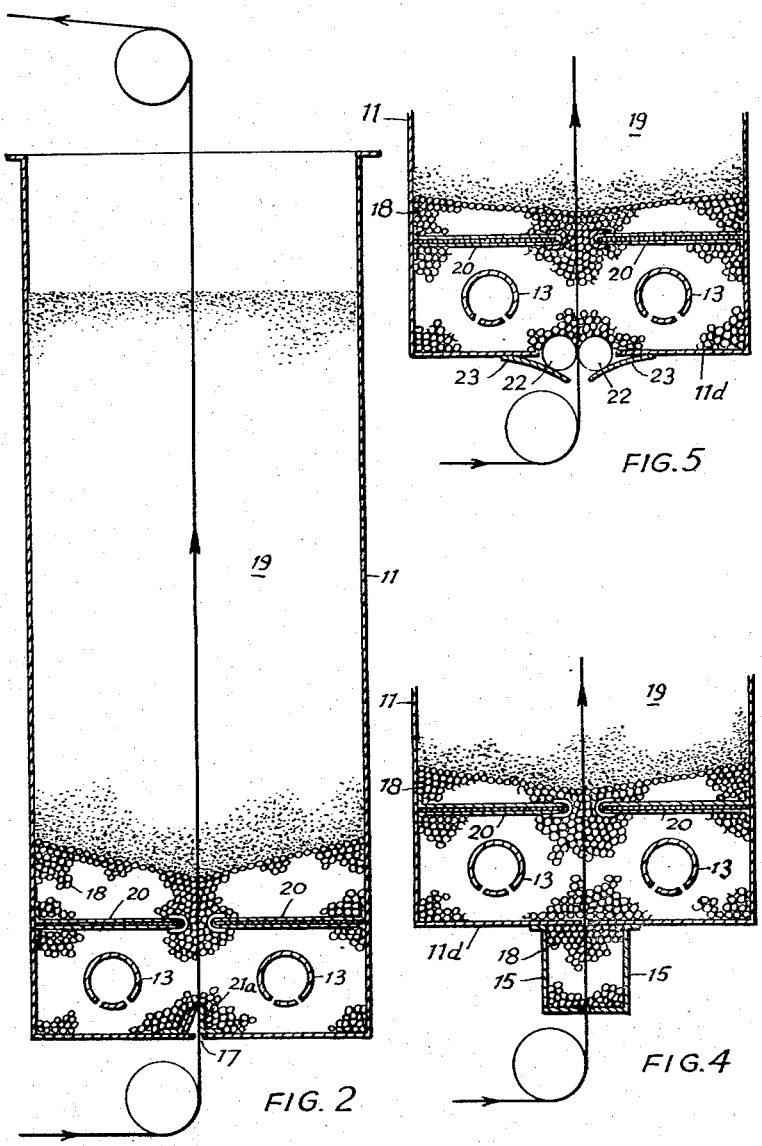

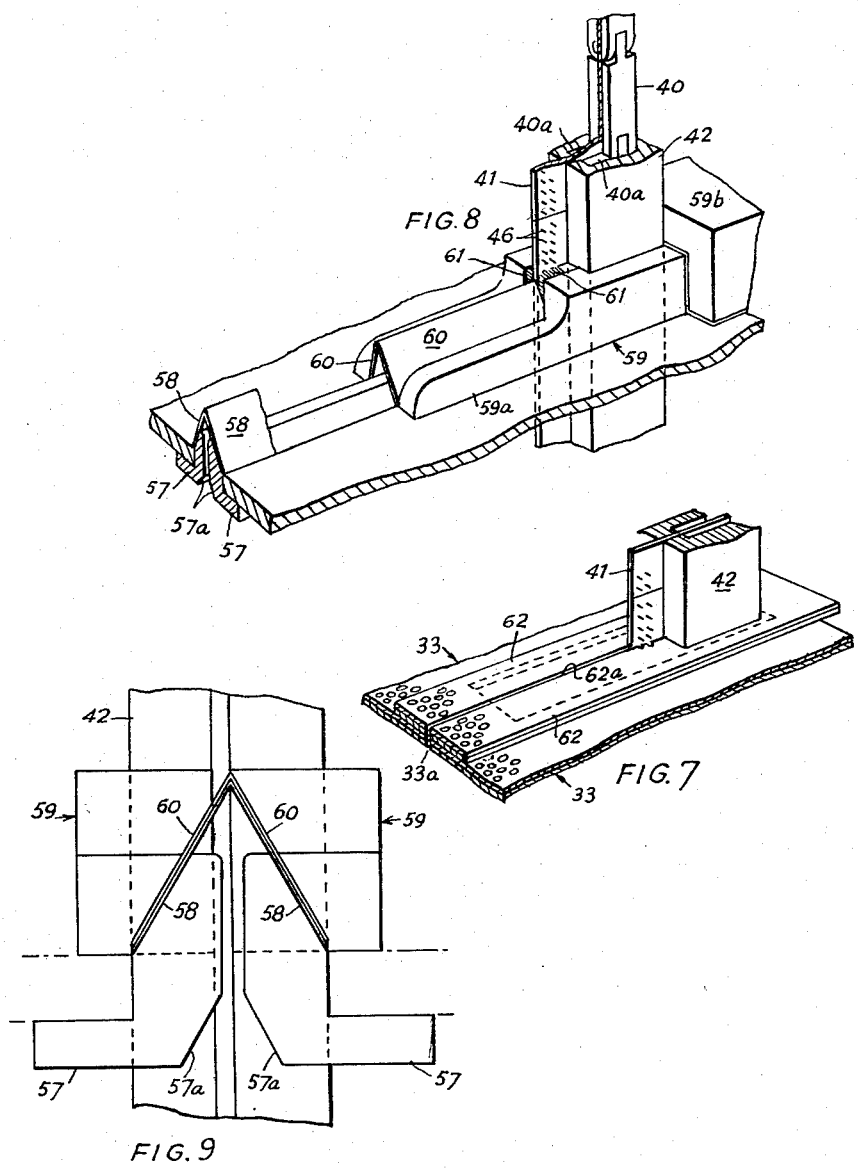

United States Patent Office 2,971,242
Patented Feb. 14, 1961

2,971,242

FLUIDISED BEDS

Jack Doleman, Cheadle Hulme, and William Vivian Morgan, Manchester, England, assignors to The British Rayon Research Association, Manchester, England, a British association Filed Feb. 11, 1957, Ser. No. 639,480

Claims priority, application Great Britain Feb. 18, 1956

7 Claims. (Cl. 26—60)

This invention relates to methods of treating materials using fluidised beds and to improvements in apparatus for use in the said methods.

More specifically, the present invention relates to the treatment of filaments, fibres, threads, films and sheet material in the unwoven or woven, knitted or likewise fabricated form (hereinafter called "the said material") in a bed of solid discrete particles, while subjecting the bed to an upward gaseous current, the size and weight of the particles and the velocity and nature of the current being so chosen that the force exerted by the current is sufficient to counterbalance the gravitational force on free particles and to expand the bed thus allowing movement of the particles but is insufficient to convert the bed into a stream of particles. A bed of solid discrete particles subjected to and expanded by such an upward gaseous current in the manner described is herein and in the claiming clauses hereof called "a fluidised bed."

One object of the present invention invention is to provide an improved apparatus whereby material of the aforesaid kinds may be led into or out of a fluidised bed in a substantially vertical direction. In some circumstances it is desirable to pass the said material through the bed from top to bottom or bottom to top, the said material, for example being entered through the base of the fluidised bed and emerging from the top. The introduction of the said material through the base of the bed gives rise to a problem which may be generally expressed as that of introducing a moving member through a gap leading into a bed of freely moving particles, while preventing the particles from escaping downwardly through the gap. The same or a similar problem exists when the said material leaves through the base of the fluidised bed. This problem arises largely because the particles of the fluidised bed will nearly always be smaller than the openings in the bed for the material (say 500 microns or less in diameter). When treating cloth some freedom of movement at right angles to its direction of travel is necessary for practical reasons, as for example when stentering means for employed and in such cases, leakage through the clearances necessary for such means is inevitable unless further sealing means are employed. When treating a series of ends of yarn or other body of varying cross-section there would likewise be leakage even when using a conventional type of seal.

A further object is to improve such stentering means when used in conjunction with fluidised beds. By the term "stentering means" is meant means adapted to support a length of fabric and to exercise weftwise (i.e. transverse) control over the same as it passes through a fluidised bed.

According to one aspect of the present invention the apparatus for treating in a fluidised bed as herein defined a filament, fibre, thread, film or sheet material in the unwoven or woven, knitted or likewise fabricated form is characterised by a seal at the base of the fluidised bed through which the material to be treated is passed continuously or intermittently, the said seal comprising unfluidised particles of larger size than those in the fluidised bed. The said larger particles may also conveniently be of greater density than the fluidised particles.

The aperture at the base through which the said material passes may, in the case of a film or sheet of fabric, be in the form of a slit in the base of the container, of sufficient width to allow the said material to pass unhindered therethrough. The larger particles may be located adjacent the aperture by an air-permeable enclosure which is itself apertured to allow the material to pass. The size of the larger particles will depend on the clearances desired. We have found when drying woven cotton fabric, that the larger particles are conveniently three millimetres in diameter, the aperture being just less than this in width, and the particles of the main mass of the bed being half a millimetre in diameter. The enclosure may take the form of two parallel vertical partitions extending, one on each side of the slit in the container base, across the bed container, the top edges thereof being flanged towards one another to leave a gap for the cloth but not large enough to allow the particles to escape from within. Slots are preferably provided along the sides of the enclosure near the top thereof, again not wide enough to allow particles from within to escape.

We have found ballotini (glass spheres) to be admirably suited as particles for both the bed and for the said seal.

It is frequently necessary that the transverse dimensions of the material under treatment (when in sheet form) should be controlled. For example when drying cloth there is usually a tendency for the cloth to shrink weftwise, and in existing drying enclosures a stentering operation is resorted to in order to prevent or control shrinkage. When using a fluidised bed widthwise control of sheet material being treated therein causes special problems, especially where the material passes directly (i.e. substantially without change of direction) through the bed and existing designs of stentering means are unsuitable. Where a combination of fluidised bed and stentering means is to be employed, provision for the material entering directly into the bed through a wall of the container must be made but in addition the entry of the stentering means must also be made possible.

According to another aspect of the invention the apparatus for treating in a fluidised bed as herein defined sheet material comprises stentering means for controlling the sheet material in the fluidised bed, said stentering means including a pair of endless flexible members, each running in and supported by guideways and arranged to engage the sheet material adjacent a longitudinal edge thereof and to exercise weft-wise control over the said material during its passage through the fluidised bed, the clearances between the endless members and the guideways being such that the particles in the fluidised bed are prevented from introducing themselves between the relatively moving parts of the stentering means.

In another aspect of the invention described in the preceding paragraph, the said stentering means may be used otherwise than with the form of seal therein described.

In one embodiment of stentering means according to the invention, the guideways are in the form of hollow elongated box-like members of rectangular cross-section. These are suitably supported within the bed in the path which the fabric is to take, one at each side. An endless flexible member, such as a link-chain runs within each guideway, and attached to each link so as to extend laterally through a slot in one wall of the guideway into the bed, is an arm, the end of which carries pins, clips, or the like, capable of gripping a longitudinal edge of a length of fabric. Blocks of carbon, graphite, or like dry lubricant are provided against the appropriate inner face of each guideway to serve as a bearing surface for the linkage and a positive transverse location for the stenter chain.

The guideways may be supplied with compressed air. Flexible strips (for instance, of Phosphor bronze) may be provided across the clearances between arms and slots to reduce the loss of air and to discourage any undersize particles which may inadvertently be present in the bed from entering the guideways. Adjacent arms may be bonded together, end-wise, with a flexible medium, for instance, rubber, or the end-wise gaps between adjacent arms may be less than the size of the smallest particle.

In order to be able to adjust the weft-wise control exerted on the fabric by the stentering means, the spacing of the guideways may be arranged to be variable.

For the most successful use of this invention, the bed particles should be closely graded to prevent particles of a diameter less than the clearance between the arms and the slots being present in any significant numbers in the bed. By significant numbers we mean such amount that on entry into the guideways would result in greater wear than that experienced in known stenters used in comparative circumstances.

According to yet another aspect of the invention, apparatus according to our invention comprises a container adapted to contain a bed of solid discrete particles when in the unfluidised and when in the hot fluidised state, the overall particle diameter being not less than 250 microns and preferably not more than 500 microns, means for applying an upward gaseous current to the said bed at a pressure and velocity sufficient to counter-balance the gravitational force on free particles and to expand the said bed thus allowing movement of the particles, means for heating the fluidised bed, means for continuously conveying the material under treatment through the fluidised bed, an opening in the base of the said container to allow the material under treatment to pass through the said base and means arranged to retain at the base of the container, at least adjacent the said opening, a bed of particles at least four times the average diameter of the particles in the fluidised bed and not more than eight times the said diameter.

The apparatus described in the preceding paragraph may be used in conjunction with stentering means made in accordance with one aspect of our invention as already described.

The invention will now be described further by way of example with reference to the accompanying drawings, in which:

Fig. 1 is a diagrammatic sectional end view of the base of a container for a fluidised bed according to the invention;

Fig. 2 is a diagrammatic sectional end view of another form of container for a fluidised bed, also in accordance with the invention;

Fig. 3 is a perspective view of the lower part of the arrangement shown diagrammatically in Fig. 2;

Figs. 4 and 5 are diagrammatic sectional end views of modifications of the lower part of the container shown in Figs. 2 and 3;

Figs. 7, 8 and 9 are detail views of parts of the arrangement shown in Fig. 6.

Figure 6:
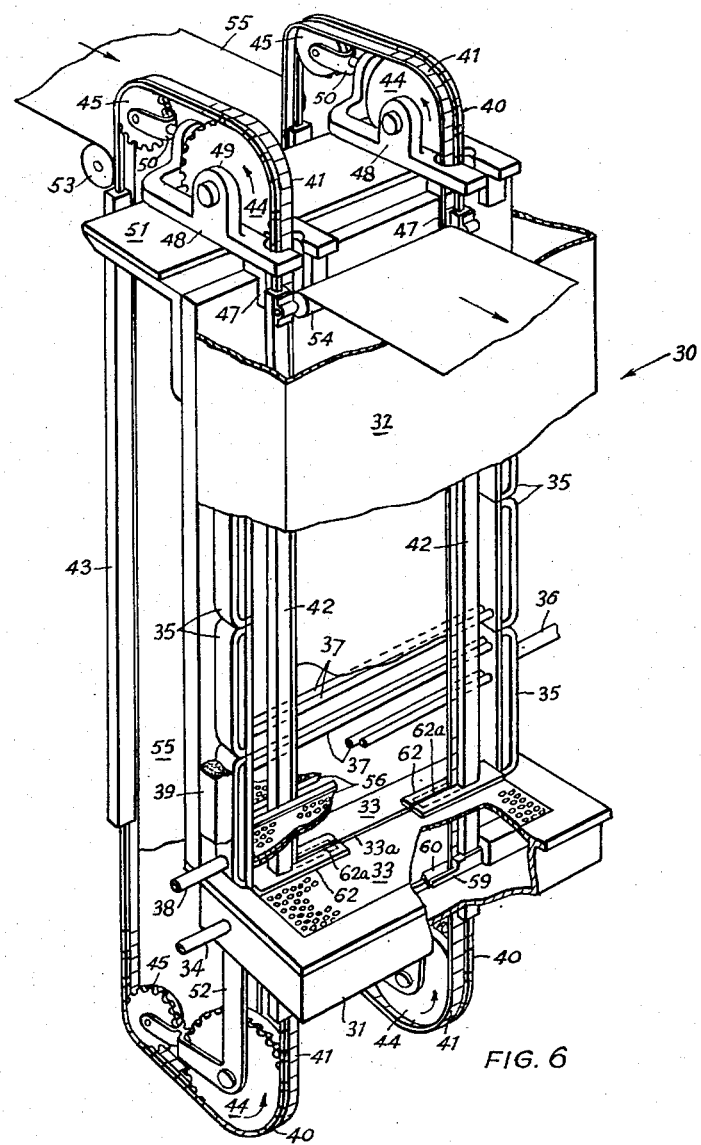
Fig. 6 is a perspective view of a fluidised bed for treating sheet material, and including a stentering means, constructed in accordance with the invention.

Referring firstly to Fig. 1 a container 11 has a false base 11a, the space below which constitutes an air-box 12. Supply pipes 13 for pressure air lie transversely of the air-box 12. The false base 11a of the container 11 has a transverse aperture 14, the base 11a itself being formed from brass gauze 11b of 80's mesh held between perforated sheet steel plates 11c.

Above the aperture 14 and supported on the base 11a are two partitions 15, flanged over and inwardly at their top ends to form an enclosure. Within the enclosure formed by the partitions 15 are disposed (so as to fill the enclosure about three-quarters full) ballotini 18 of three millimetres diameter. The partitions 15 are slotted near their upper ends, the slots 16 and the gap between their flanged portions being a little less than three millimetres to prevent escape of the ballotini. The width of the aperture 14 is of the same magnitude for the same purpose.

In use the material to be treated passes from a roller through a sealed aperture 17 in the base proper 11d of the container and through the aperture 14 in the false base 11a of the container 11. It then moves on through the mass of larger diameter ballotini 18, and out of the enclosure formed by the partitions 15 by way of the gap between their flanged upper ends and into the bed proper 19 which is composed of half millimetre diameter ballotini. With the air supply turned on, the arrangement acts as an effective seal for the entrance of the material into the bed. The large ballotini 18 are not fluidised. We find that the provision of the slots 16 encourage any of the smaller ballotini which may find their way into the enclosure through the gap between the flanged ends of the partitions 15 to be returned to the main mass of the bed therethrough.

Referring now to Figs. 2 and 3 (and using like reference numerals for like parts as in Fig. 1), a bed container 11 has a base 11d, and air supply pipes 13 are disposed within the container 11. Above the pipes 13 are two plates 20 of similar porous construction to the false base 11a of the container in Fig. 1. These plates 20 are spaced from each other at their inner ends by an amount substantially greater than three millimetres (e.g. half an inch) which is the diameter of ballotini particles 18 which are disposed in the bottom part of the container 11 to a depth sufficiently greater than the height of the plates 20 above the base 11d to ensure that smaller ballotini particles (half a millimetre in diameter) forming the main mass of the bed 19 do not reach the plates 20 and pass through the space between them. The bottom 11d of the container 11 has an aperture 17 transversely thereof to admit the material to be treated and this aperture has a seal 21 to reduce air losses. Such seal 21 may consist of a rigid angle 21a along one side of the aperture and a flexible Phosphor bronze member 21b supported by another rigid angle 21c along the other side of the aperture.

In use, the material to be treated passes off a roller through the sealed aperture in the container base 11d, and between the plates 20, passing first through the largest diameter ballotini 18 and then into the main mass of the bed 19 above the plates 20. Again we have found that with the air supply turned on, and the material passed into the container 11, the arrangement at the lower part of the container acts as an effective seal for the entrance of the material into the main bed 19. Again the larger ballotini 18 are not fluidised. The provision of the plates 20 is important. Not only do they serve as additional supports for the bed when not fluidised, but, if they were not present the tendency would be for the larger ballotini 18 to be divided to each side of the seal 21, thus allowing the smaller particles to reach that region.

The aperture 17 in the base 11d of the container 11 may be sealed in other ways. For instance (see Fig. 4) an enclosure similar to that described with reference to Fig. 1, but inverted, may be secured beneath the base of the container. This enclosure will hold three millimetre diameter baloltini and be of sufficient depth to ensure that air losses are reduced to negligible proportions.

Another alternative construction is shown in Fig. 5. In this case a pair of rollers 22 are disposed in the base 11d, the material passing through the nip. Flexible sealing strips 23 contact the lower periphery of the rollers.

Referring now to Figs. 6, 7, 8 and 9 there is illustrated (with parts broken away to show the construction more clearly), a fluidised bed machine, especially intended for the drying of material (e.g. textile fabric) in sheet form and incorporting a stentering means.

The machine comprises, basically, a container for the bed, the lower part of which constitutes an air-box, air supply means, heating means, stentering means, cloth guiding means, and adjustable admission and sealing means for the stentering means in the lower part of the container.

The container 30 is robustly constructed from sheet metal and is supported on a suitable framework the details of which are omitted for the sake of clarity. It is of rectangular cross-section adequate to accommodate the width of the material to be treated as it passes upwardly therethrough, and deep enough to hold a bed of a depth sufficient to effect the necessary treatment.

The lower part 31 of the container 30 is separated from the upper part 32 to form an air-box by a horizontal partition 33 (see Fig. 7) which is a porous to act as a distributing air resistance, and which will be described in more detail hereinafter. A pipe 34 leads into the air-box and serves to introduce pressure air thereto for fluidising the bed of particles located in the upper part 32 of the container 30.

The upper part 32 of the contianer 30 is provided with heating means to enable the bed material to be kept at the requisite temperature. Hollow jackets 35 are disposed at the inside of the shorter container walls and are fed with steam by means of inlet pipes 36. Pipes 37 connect the jackets at the opposite sides of the container 30 so that the heating effect is obtained across the whole width of the bed (all of which pipes have not been shown in the interests of clarity). Condensate outlets 38 are also provided. The hollow jackets 35 are insulated from the actual container walls by blocks 39 of suitable heat-insulating material, all of which are not shown in the interests of clarity.

The stentering means consists of a pair of endless chains 40 carrying stenter blocks or plates 41, guides 42 within the container 30, guides 43 outside the container 30, pairs of chain-wheels 44 above and below the container 30, and, associated with each chain wheel 44, an out-rider 45.

Each chain 40 is formed from the usual links, and the stenter plates 41 which may be integral therewith or attached thereto, extend from that face of the chain which lies inwardly of the bed. There is one plate 41 per link, each having on one face the usual stenter pins 46 which serve to engage the edges of the material to be treated as it is carried through the bed by the chains 40. The plates are disposed in offset position on the links.

For guiding and locating the chains 40 through the container 30, and also on their return run outside the bed, are provided guides 42, 43. Each guide is hollow and of rectangular cross-section to provide for a close running fit of a chain therewithin. One wall of each guide has an elongated aperture to enable the stenter plates 41 to extend therethrough. The clearance between the aperture and the sides of the stenter plates 41 is less than the diameter of the fluidised bed particles. Blocks 40a of dry lubricant (carbon for example) are disposed at the inner face of the slotted side of each guide to provide a suitable bearing surface for the chain.

The guides 42 are disposed vertically in the bed container 30, one at each side thereof. They pass into the lower part of the container 30, through the air box and partition 33, and may be adjusted inwardly or outwardly by virtue of adjustable admission and sealing means to be described in more detail hereinafter. At the upper end of the container 30, above the level of the bed material the guides 42 are adjustably secured to mounting blocks 47 which in turn are adjustably attached to the reinforced rear wall of the container 30.

The guides 43 are adjustably supported behind the rear wall of container 30 by any suitable means.

To drive the chains 40 and to pass them from their upward run through the bed container 30 to their downward run behind the bed container 30 and vice versa there are provided both above and below the container sets of chain wheels 44 with out-riders 45. Above the container there are two chain wheel and out-rider assemblies each consisting of a bracket 48, a chain wheel 44 mounted for rotation between upstanding lugs 49 thereon, and an out-rider 45 mounted for rotation between the arms of a bifurcated support 50 extending rearwardly of the bracket 48. Each bracket 48 is carried at its front end by the top of the respective block 47 and at its middle and rear by a platform 51 attached to the rear wall of the container 30. Below the container there are two further chain wheel and out-rider assemblies each consisting of pairs of L-shaped brackets 52 secured adjustably to the underside of the bed container 30 between which the chain wheel 44 and out-rider 45 are mounted for rotation.

Each chain wheel 44 and out-rider 45 is flanged to locate the shoulders formed between the chain links and stenter plates, and either the bottom or upper chain wheels are driven by suitable means (not shown). Means are provided for adjusting the spacing of the chain wheel and out-rider assemblies, preferably in unison to ensure parallelism of the guides 42, 43. For example a lead screw with right and left hand screw threads may be used in known manner for adjusting the upper assemblies. A handle may be used for turning the lead screw which may be linked by bevel gears and a shaft to a similar lead screw operating the bottom two assemblies. As such an arrangement is well known it has not been illustrated in the drawings.

The upper assemblies are also pivotable about an axis coinciding with that of the chain for a purpose presently to be described.

Cloth guiding rollers 53, 54 are provided for guiding the oncoming material 55 onto and off the stenter pins 46 respectively. The roller 53 is disposed, for rotation about a horizontal axis, adjacent the chains 40 and plates 41 just before they enter the rear guides 43. The roller 54 is similarly disposed adjacent the chains and plates just before they emerge from the bed guides 42.

The adjustable admission and sealing means is based on the arrangement shown in Figs. 2 and 3.

Two plates 56 extend inwardly from the front and rear walls of the container 30 above the partition 33 leaving a gap which is sufficient to accommodate the guides 42. The plates are of similar porous construction to the plates 20 (Figs. 2 and 3).

The lower part 31 of the container 30 which forms the air-box has a longitudinal slot in its base secured to the sides of which are angle members 57 leaving a slit through which material to be treated enters the air-box (Figs. 8 and 9). The entrance to the slit is formed by the chamfered lower corners 57a of the members 57. The inner rear faces of the members 57 are inclined to support Phosphor bronze sealing strips 58. The angle members 57 and their sealing strips 58 are fixed in position and extend over the central part of the slot in the base of the air-box. At each side, the respective guide 42 is in good sliding fit in a slot so as to be adjustable therealong, and is associated with complementary sealing means to ensure that an effective air seal is achieved at all times. Each guide is carried in a block 59, the inwardly extending part 59a of which carries inclined Phosphor bronze sealing strips 60 within which the sealing strips 58 just telescope. A brush seal 61 is preferred in the region of the stenter pins 46. The outwardly extending part 59b of the block serves to cover the end of the slot in the base of the air-box which is not being used. By this arrangement the air seal is maintained for all adjustments of the guides 42.

The partition 33 is also specially constructed to allow for adjustment of the guides 42 (Fig. 7). It is constructed from brass gauze between perforated plates to enable it to act as an air distributing resistance and has a slit 33a extending from side to side. The slit is widened to a slot at each side to accommodate the guides 42 and to allow adjustment thereof, and attached to each guide where it emerges above the partition 33 is a small cover plate 62 of similar porous construction to the partition 33 and having a slit 62a corresponding to the slit 33a in the latter. The size of each cover plate 62 is such that the slots in the partition 33 for the guides are never uncovered.

In order to put the machine into operation the part of the container 30 above the air-box is filled with ballotini of three millimetres in diameter to a level well above the plates 56. The remainder of the container to near the top end is filled with half millimetre ballotini to form the main mass of the fluidised bed. The slit 33a in the partition 33 and the slit 62a in the cover plate 62 are both just less than three millimetres wide so that the larger ballotini cannot escape into the air-box.

Before filling, cloth to be treated or a threading piece to which the cloth may subsequently be attached is suspended through the bed.

The spacing of the chain wheel and out-rider assemblies is set, and the upper assemblies pivoted to give the desired inclination (if any) to the guides 43.

The cloth is led onto the stenter pins 46 by the roller 53 and is carried down to below the machine and then upwardly into the container through the admission and sealing means.

Fluidising air is then fed via the inlet 34 to the air-box and the bed raised to the required temperature by the heating means.

The drying and stentering of the cloth then proceeds as a continuous process, the treated cloth being stripped from the stentering means by the roller 54 and conveyed away.

It is to be noted that the stenter chains may have to twist slightly if the upper chain wheel and out-rider assemblies are slewed and they should be designed with this in mind. The offset position of the plates 41 with respect to the links 40 enables the stentering means to negotiate the turns at top and bottom of the machine, and should, in fact, be offset just sufficiently to allow of this.

We claim:

1. Apparatus for treating elongated material in a fluidised bed composed of small discrete, solid particles, comprising, in combination, a container having a base with at least one opening therethrough; a bed of small, solid, discrete particles in said container above said base; means for applying an upward gaseous current to said bed at a pressure and velocity to counterbalance the gravitational force of said particles and to expand said bed thus allowing movement of said particles and providing a fluidised bed; means for heating the fluidised bed; means for continuously conveying the material to be treated through said opening in said base and upwardly through said fluidised bed; a second bed of discrete solid particles of a size larger than said particles of said fluidised bed in the region of said opening in said base; and retaining means for retaining the particles of said second bed about said opening thus preventing the particles of said fluidised bed from escaping through said opening.

2. Apparatus for treating elongated material in a fluidised bed composed of small, discrete, solid particles, comprising, in combination, a container having a base with at least one opening therethrough; a bed of small, solid, discrete particles in said container having a diameter of not less than 250 microns and not more than 500 microns above said base; means for applying an upward gaseous current to said bed at a pressure and velocity to counterbalance the gravitational force of said particles and to expand said bed thus allowing movement of said particles and providing a fluidised bed; means for heating the fluidised bed; means for continuously conveying the material to be treated through said opening in said base and upwardly through said fluidised bed; a second bed of discrete solid particles at least four times the average diameter of the particles in the fluidised bed and not more than eight times said diameter in the region of said opening in said base; and retaining means for retaining the particles of said second bed about said opening thus preventing the particles of said fluidised bed from escaping through said opening.

3. In an apparatus for treating elongated sheet material moving through a fluidised bed composed of small, discrete, solid particles, in combination, a pair of endless flexible members spaced from each other and extending through the bed, said pair of endless flexible members having, respectively, elongated attaching edge portions facing each other and adapted to engage longitudinal edge portions of the material to be treated to exercise weft-wise control thereover; and a pair of elongated guide means for guiding said endless flexible members during their movement through the bed, said guide means enclosing said endless flexible members with the exception of said attaching edge portions thereof and said guide means having elongated slots through which said attaching edge portions extend with clearance beyond said guide means, said clearances between said attaching edge portions and said guide means being smaller than the smallest of said particles of the bed so that said particles are prevented from entering through said clearances into said guide means.

4. Apparatus according to claim 2 in which the said retaining means includes an air permeable barrier which is impermeable to the said larger particles.

5. Apparatus according to claim 3 in which the said endless flexible members each comprise an endless linkchain with laterally extending material engaging means at the material engaging edges thereof.

6. Apparatus according to claim 3, in which the said guide means are each in the form of a hollow elongated box of rectangular cross-section.

7. An apparatus according to claim 2 in which said conveying means includes stentering means comprising a pair of endless flexible members spaced from each other and extending through the bed, said pair of endless flexible members having, respectively, elongated attaching edge portions facing each other and adapted to engage longitudinal edge portions of the material to be treated to exercise weft-wise control thereover; and a pair of elongated guide ways for guiding said endless flexible members during their movement through the bed, said guide ways enclosing said endless flexible members with the exception of said attaching edge portions thereof and said guide ways having elongated slots through which said elongated edge portions extend with clearance beyond said guide ways, said clearances between said attaching edge portions and said guide ways being smaller than 250 microns, so that the smallest of the particles of the bed are prevented from entering through said clearances into said guide ways.

References Cited in the file of this patent

UNITED STATES PATENTS

| | | |
|---|---|---|
| 1,687,118 | Winkler | Oct. 9, 1928 |
| 2,516,974 | Garrison | Aug. 1, 1950 |
| 2,785,478 | Audas et al. | Mar. 19, 1957 |